(12) United States Patent
Best et al.

(10) Patent No.: US 8,700,216 B2
(45) Date of Patent: Apr. 15, 2014

(54) STEERING ROBOT

(75) Inventors: Anthony Best, Wiltshire (GB); Stephen John Neads, Somerset (GB); Mathew James Hubbard, Wiltshire (GB)

(73) Assignee: Anthony Best Dynamics Limited, Wiltshire (GB)

( * ) Notice: Subject to any disclaimer, the term of this patent is extended or adjusted under 35 U.S.C. 154(b) by 181 days.

(21) Appl. No.: 13/383,846

(22) PCT Filed: Jun. 21, 2010

(86) PCT No.: PCT/GB2010/001203
§ 371 (c)(1),
(2), (4) Date: Mar. 30, 2012

(87) PCT Pub. No.: WO2011/007114
PCT Pub. Date: Jan. 20, 2011

(65) Prior Publication Data
US 2012/0179295 A1    Jul. 12, 2012

(30) Foreign Application Priority Data

Jul. 14, 2009  (GB) .................................. 0912228.4

(51) Int. Cl.
G05B 15/00 (2006.01)
G06F 19/00 (2011.01)

(52) U.S. Cl.
USPC ........................... 700/258; 700/245; 700/250

(58) Field of Classification Search
USPC ................................................ 700/245, 248
See application file for complete search history.

(56) References Cited

FOREIGN PATENT DOCUMENTS

EP       1 617 199 A2    1/2006
WO      94/20340 A1     8/1994

*Primary Examiner* — Ian Jen
(74) *Attorney, Agent, or Firm* — Bay State IP, LLC

(57) ABSTRACT

A steering robot for attachment to a vehicle's steering wheel has its own steering wheel attached to a rotor of an annular motor. The latter has a stator. Fitted to the forward (in use) side of rotor is an annular mounting plate, having three tabs extending slightly inwards for receiving mounting bolts. A clamp formed of a ring having equally spaced around it three slotted radial lugs. The lugs provide attachments for three clamping fixtures, by means of which the clamp can be attached temporarily to the vehicle's steering wheel. The stator has a pair of torque reaction lugs via which steering torque exerted by the motor to effect a steering maneuver under test or investigation can be reacted. The steering robot is open-centered, whereby steering wheel mounted controls can be operated normally.

8 Claims, 1 Drawing Sheet

STEERING ROBOT

CROSS REFERENCE TO RELATED APPLICATION

This application is for entry into the U.S. National Phase under §371 for International Application No. PCT/GB2010/001203 having an international filing date of Jun. 21, 2010, and from which priority is claimed under all applicable sections of Title 35 of the United States Code including, but not limited to, Sections 120, 363 and 365(c), and which in turn claims priority under 35 USC 119 to United Kingdom Patent Application No. 0912228.4 filed on Jul. 14, 2009.

FIELD OF THE INVENTION

The present invention relates to a steering robot and in particular a steering robot for turning a vehicle's steering wheel under robotic control.

BACKGROUND OF THE INVENTION

Our known steering robot comprises:
a steering column boss, adapted to be secured to a steering column;
a rotor of a motor for robotic steering, the rotor being fast with the column boss for turning the column;
a manual steering wheel fast with the rotor; and
a stator with respect to which the rotor is rotatably mounted for turning of the rotor for robotic steering.

This robot suffers from the disadvantage that it is inconvenient and slow to fit to a vehicle. Not only must the existing steering wheel be removed, but also steering wheel mounted controls have to be disabled. In some installations where no steering wheel airbag is fitted, we have attempted to circumvent these difficulties by providing an adapter clamping onto the steering wheel rim and able to have the steering robot attached to it.

Where an airbag is fitted to the original steering wheel, removal requires particular care. Further the air bag is no longer available for the driver testing the car. Also air bag removal from certain cars may cause the car's electronic control system to restrict performance of the car.

In no circumstances is it acceptable to fit our known steering robot to an airbag equipped steering wheel with the above adapter for non-airbag steering wheels; it is dangerous in risking the air bag propelling the massive motor towards the driver.

SUMMARY OF THE INVENTION

The object of the present invention is to provide an improved steering robot.

According to the invention there is provided a steering robot for turning a vehicle's steering wheel under robotic control, the robot comprising:
an open-centred steering wheel, for manual control of the vehicle;
means for clamping this, robot's, steering wheel to the vehicle's steering wheel at a plurality of points around them for transferring rotation from the robot's steering wheel to the vehicle's steering wheel, the clamping means being open centrally of the robot's steering wheel and the plurality of clamping points; and
an open-centred motor having an annular rotor fast with the robot's steering wheel and an annular stator adapted to be anchored against rotation for driving of the steering wheel under robotic control.

Preferably, the clamping means includes:
a plurality of clamping fixtures for clamping the rotor to the vehicles steering wheel at the said points and
a ring interconnecting the clamping fixtures,
whereby the clamping means is open-centred.

As a result of the three primary components of the robot, and the robot itself, being open-centred, normal access is available to controls mounted on the vehicle's steering wheel and/or normal operation of an airbag mounted in the vehicle's steering wheel is possible.

Preferably, the clamp is provided with means for adjusting concentricity of the robot's steering wheel with the vehicle's steering wheel.

Normally the robot will include an annular encoder for transmitting data relating to angular movement of the rotor with respect to the stator.

Further the steering robot will normally be provided with means for measuring torque exerted by the motor. Conveniently this is provided in the form of a respective load cell in each of a pair of arms connecting the stator to an anchorage.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENTS

Figure 1:
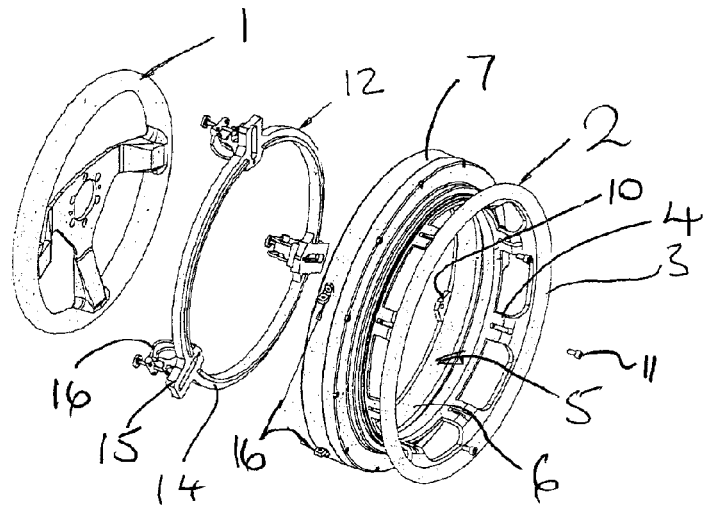
FIG. 1 is an exploded view of a steering robot of the invention.

Referring to the drawings, a steering robot for attachment to a vehicle's steering wheel 1 has its own steering wheel 2, essentially comprising a rim 3 and series of circumferentially spaced fingers 4. These are attached to an annular rotor 5 of an annular motor 6. The latter has an annular stator 7. An annular rolling element bearing 8 is provided between the stator and the rotor. Fitted to the forward (in use) side of rotor is an annular mounting plate 9, having three tabs 10 extending slightly inwards for receiving mounting bolts 11.

A clamp 12 formed of a ring 14 having equally spaced around it three slotted radial lugs 15. The lugs provide attachments for three clamping fixtures 16, by means of which the clamp can be attached temporarily to the vehicle's steering wheel 1. Since this may not have a truly circular rim, the clamp may not be attached concentric with the steering column of the vehicle concerned. Adjustment for concentricity is available by means of the tabs 10, bolts 11 and lugs 15.

The stator has a pair of torque reaction lugs 16 via which steering torque exerted by the motor to effect a steering manoeuvre under test or investigation can be reacted. It is reacted via a pair of reaction links 17, including load sensors 18, by a reaction assembly 19 adapted to be braced between the vehicles floor and windscreen in a known manner. An annular encoder 20 is provided within the motor from which a robotic controller (not shown) receives steering wheel angle data.

Figure 2:
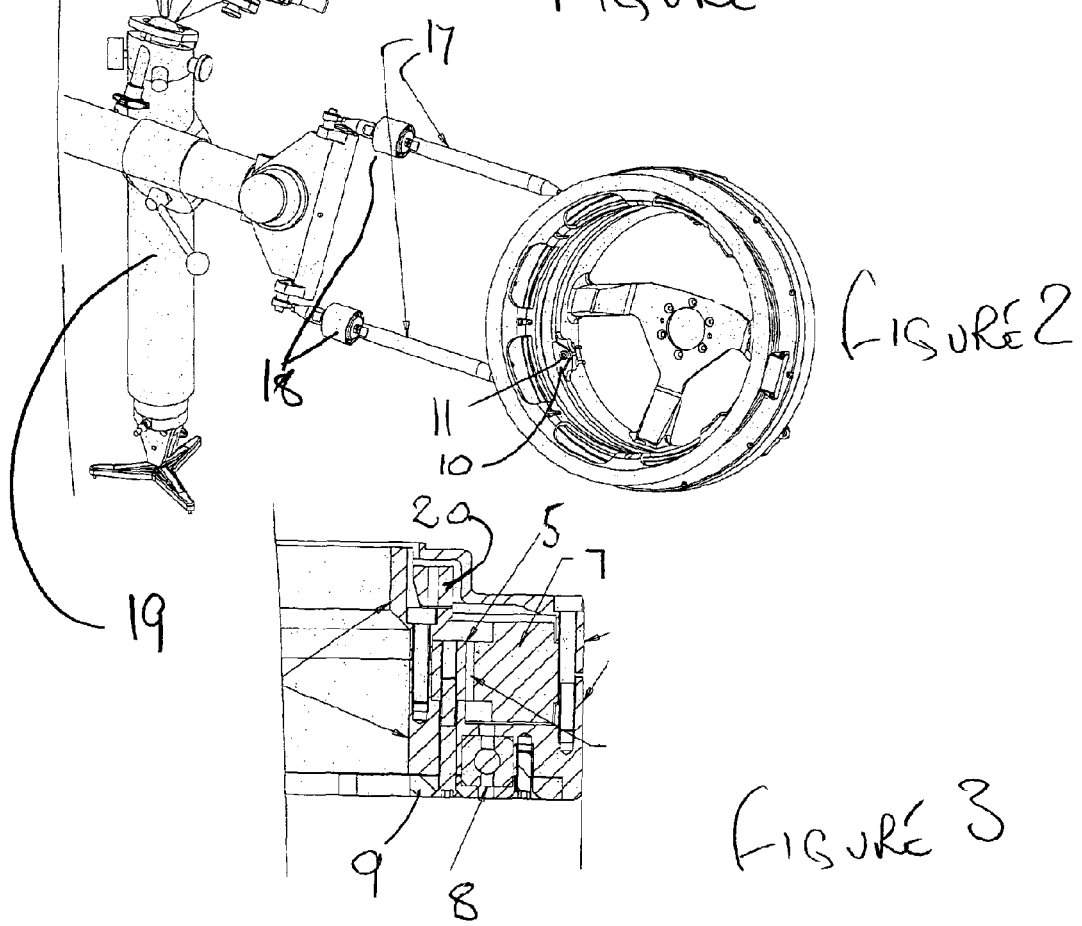
FIG. 2 is a perspective view of the steering robot.
Figure 3:
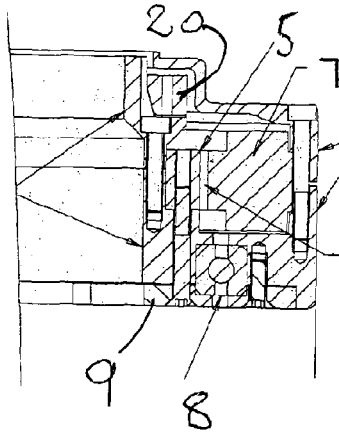
FIG. 3 is a cross-sectional view through a steering motor of the steering robot.

It will be noted from FIG. 2, even although this shows a conventional steering wheel 1, that the wheel is not obscured by the steering robot. This results from the open-centred construction of the steering robot, whereby steering wheel mounted controls such as cruise control and in particular a steering wheel mounted air bag can operate/be operated normally.

The invention claimed is:

1. A steering robot for turning a vehicle's steering wheel under robotic control, the robot comprising:
    an open-centred steering wheel, for manual control of the vehicle;
    means for clamping this, robot's, steering wheel to the vehicle's steering wheel at a plurality of points around them for transferring rotation from the robot's steering wheel to the vehicle's steering wheel, the clamping means being open centrally of the robot's steering wheel and the plurality of clamping points; and
    an open-centred motor having an annular rotor fast with the robot's steering wheel and an annular stator adapted to be anchored against rotation for driving of the steering wheel under robotic control.

2. A steering robot as claimed in claim 1, wherein the clamping means includes a plurality of clamping fixtures for clamping the rotor to the vehicles steering wheel at the said points.

3. A steering robot as claimed in claim 2, wherein the clamping means includes a ring interconnecting the clamping fixtures.

4. A steering robot as claimed in claim 1, wherein the clamping means is provided with means for adjusting concentricity of the robot's steering wheel with the vehicle's steering wheel.

5. A steering robot as claimed in claim 1, further comprising an annular rolling element bearing between the annular rotor and the annular stator.

6. A steering robot as claimed in claim 1, further comprising an annular encoder for transmitting data relating to angular movement of the rotor with respect to the stator.

7. A steering robot as claimed in claim 1, further comprising means for measuring torque exerted by the motor.

8. A steering robot as claimed in claim 7, wherein the torque measuring means is a respective load cell in each of a pair of arms connecting the stator to an anchorage.

* * * * *